(12) United States Patent
Boudreaux

(10) Patent No.: US 7,605,493 B1
(45) Date of Patent: Oct. 20, 2009

(54) ELECTRICALLY POWERED VEHICLE ENGINE

(75) Inventor: Joseph P. Boudreaux, 208 Elysian Dr., Houma, LA (US) 70363-6917

(73) Assignee: Joseph P. Boudreaux, Houma, LA (US)

( * ) Notice: Subject to any disclaimer, the term of this patent is extended or adjusted under 35 U.S.C. 154(b) by 226 days.

(21) Appl. No.: 11/279,158

(22) Filed: Apr. 10, 2006

Related U.S. Application Data

(60) Provisional application No. 60/735,465, filed on Nov. 9, 2005.

(51) Int. Cl.
- *B60L 11/10* (2006.01)
- *B60L 11/00* (2006.01)
- *B60L 11/18* (2006.01)

(52) U.S. Cl. ............................. 307/10.1; 307/9.1
(58) Field of Classification Search ............ 307/10.1; 180/65.3
See application file for complete search history.

(56) References Cited

U.S. PATENT DOCUMENTS

| | | | | |
|---|---|---|---|---|
| 3,477,537 A * | 11/1969 | Plishner | ............ | 180/65.4 |
| 3,659,672 A * | 5/1972 | Jacobus | ............ | 180/65.4 |
| 3,713,504 A * | 1/1973 | Shimer et al. | ............ | 180/65.1 |
| 3,870,935 A * | 3/1975 | Abels et al. | ............ | 318/52 |
| 4,113,045 A * | 9/1978 | Downing, Jr. | ............ | 180/65.4 |
| 4,196,785 A * | 4/1980 | Downing, Jr. | ............ | 180/6.28 |
| 4,444,285 A * | 4/1984 | Stewart et al. | ............ | 180/65.4 |
| 5,172,784 A * | 12/1992 | Varela, Jr. | ............ | 180/65.245 |
| 5,212,431 A * | 5/1993 | Origuchi et al. | ............ | 318/139 |
| 5,323,868 A * | 6/1994 | Kawashima | ............ | 180/65.4 |
| 5,461,289 A * | 10/1995 | Adler et al. | ............ | 318/139 |
| 5,515,937 A * | 5/1996 | Adler et al. | ............ | 180/65.2 |
| 5,566,774 A * | 10/1996 | Yoshida | ............ | 180/65.4 |
| 5,586,613 A * | 12/1996 | Ehsani | ............ | 180/65.2 |
| 5,705,859 A * | 1/1998 | Karg et al. | ............ | 290/45 |
| 5,713,426 A * | 2/1998 | Okamura | ............ | 180/65.3 |
| 5,722,502 A * | 3/1998 | Kubo | ............ | 180/65.4 |
| 5,786,640 A * | 7/1998 | Sakai et al. | ............ | 290/17 |
| 5,842,534 A * | 12/1998 | Frank | ............ | 180/65.2 |
| 5,847,470 A * | 12/1998 | Mitchell | ............ | 290/45 |
| 5,848,659 A * | 12/1998 | Karg et al. | ............ | 180/65.4 |
| 5,875,864 A * | 3/1999 | Yano et al. | ............ | 180/65.4 |
| 5,887,674 A * | 3/1999 | Gray, Jr. | ............ | 180/307 |
| 5,927,416 A * | 7/1999 | del Re et al. | ............ | 180/65.2 |
| 5,939,794 A * | 8/1999 | Sakai et al. | ............ | 290/40 A |
| 5,978,719 A * | 11/1999 | Yano et al. | ............ | 701/22 |
| 6,059,059 A * | 5/2000 | Schmidt-Brucken | ............ | 180/65.3 |
| 6,213,234 B1 * | 4/2001 | Rosen et al. | ............ | 180/65.3 |
| 6,294,843 B1 | 9/2001 | Kato et al. | | |

(Continued)

*Primary Examiner*—Stephen W Jackson
*Assistant Examiner*—Adi Amrany

(57) ABSTRACT

A vehicle which provides a standard vehicle body, transmission and electric system. There is further provided a generator component in place of the gasoline powered engine, which is capable of producing 110 volts and 220 volts to power the vehicle. There is further provided an electric motor engaged to the transmission via a chain or a universal joint. Further, there would be provided a 12 volt battery for powering the normal electrical components, namely the lights, radio, horn, fan, heater and other units. An electric motor would be utilized to operate the alternator, air compressor and vacuum pump to operate the power steering, power brakes and electric transmission. In addition, air generated by the compressor could be used to keep tires properly full, while the AC power could be used to power lamps, chain saws, stoves or electric tools, under camping or the like conditions.

6 Claims, 3 Drawing Sheets

U.S. PATENT DOCUMENTS

| | | |
|---|---|---|
| 6,318,486 B2 * | 11/2001 | Masaki ...................... 180/65.2 |
| 6,318,487 B2 * | 11/2001 | Yanase et al. .......... 180/65.245 |
| 6,326,702 B1 * | 12/2001 | Yonekura et al. .......... 290/40 C |
| 6,348,771 B1 * | 2/2002 | Morimoto et al. ........... 318/139 |
| 6,470,985 B1 * | 10/2002 | Inada et al. ................ 180/65.3 |
| 6,480,767 B2 * | 11/2002 | Yamaguchi et al. ........... 701/22 |
| 6,554,088 B2 | 4/2003 | Severinsky et al. |
| 6,581,707 B2 | 6/2003 | Morimoto et al. |
| 6,739,418 B2 | 5/2004 | Ogata et al. |
| 6,781,252 B2 | 8/2004 | Berels |
| 6,817,432 B2 * | 11/2004 | Kitada et al. ............... 180/65.3 |
| 6,827,164 B2 * | 12/2004 | Palumbo et al. ............ 180/65.1 |
| 6,836,027 B2 * | 12/2004 | Lee .......................... 290/40 C |
| 6,879,057 B1 * | 4/2005 | Pinas et al. ................ 307/10.1 |
| 6,879,888 B2 * | 4/2005 | Ochiai et al. .................. 701/22 |
| 6,889,126 B2 * | 5/2005 | Komiyama et al. ........... 701/22 |
| 6,978,854 B1 * | 12/2005 | Kuang et al. .............. 180/65.2 |
| 7,028,793 B2 * | 4/2006 | Hu et al. .................... 180/65.2 |
| 7,034,482 B2 * | 4/2006 | Komiyama et al. ......... 318/376 |
| 7,071,642 B2 * | 7/2006 | Wilton et al. ............... 318/268 |
| 7,096,098 B2 * | 8/2006 | Auguet et al. .................. 701/22 |
| 7,102,313 B2 * | 9/2006 | Kadota et al. .............. 318/465 |
| 7,117,964 B1 * | 10/2006 | Kuang et al. ............... 180/65.3 |
| 7,285,869 B2 * | 10/2007 | Syed et al. ................. 290/40 C |
| 7,345,450 B2 * | 3/2008 | Krieger et al. .............. 320/104 |
| 7,355,292 B2 * | 4/2008 | Yamashita ................ 290/40 C |
| 7,392,871 B2 * | 7/2008 | Severinsky et al. ......... 180/65.2 |
| 2001/0023790 A1 | 9/2001 | Hasegawa |
| 2002/0157883 A1 | 10/2002 | Ogata et al. |
| 2002/0179354 A1 | 12/2002 | White |
| 2004/0211605 A1 * | 10/2004 | Botti .......................... 180/65.4 |
| 2005/0127880 A1 * | 6/2005 | Colley ............................ 322/7 |
| 2005/0145426 A1 * | 7/2005 | Gray .......................... 180/65.4 |
| 2005/0211212 A1 * | 9/2005 | Novak ..................... 123/90.34 |
| 2005/0224264 A1 * | 10/2005 | Perrin ....................... 180/65.2 |
| 2006/0005737 A1 * | 1/2006 | Kumar ......................... 105/35 |
| 2006/0090941 A1 * | 5/2006 | Tamor et al. ............... 180/65.4 |
| 2006/0124368 A1 * | 6/2006 | Plishner ..................... 180/65.6 |
| 2007/0000703 A1 * | 1/2007 | Hughes et al. ............. 180/65.4 |
| 2007/0137908 A1 * | 6/2007 | Fujiwara et al. ............ 180/65.2 |

* cited by examiner

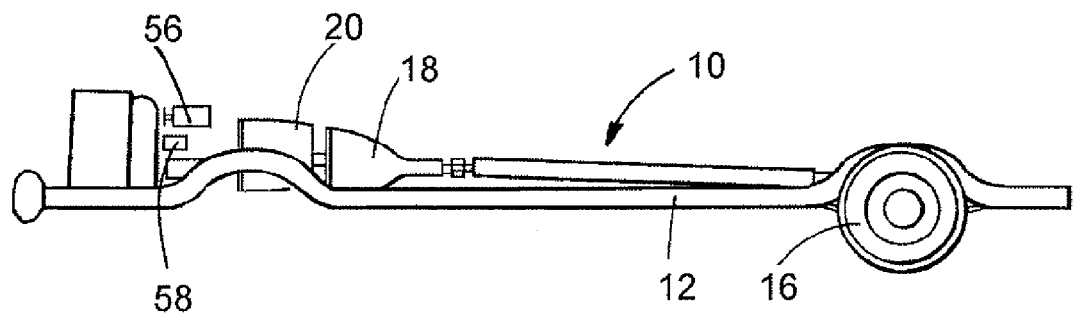
FIG. 5
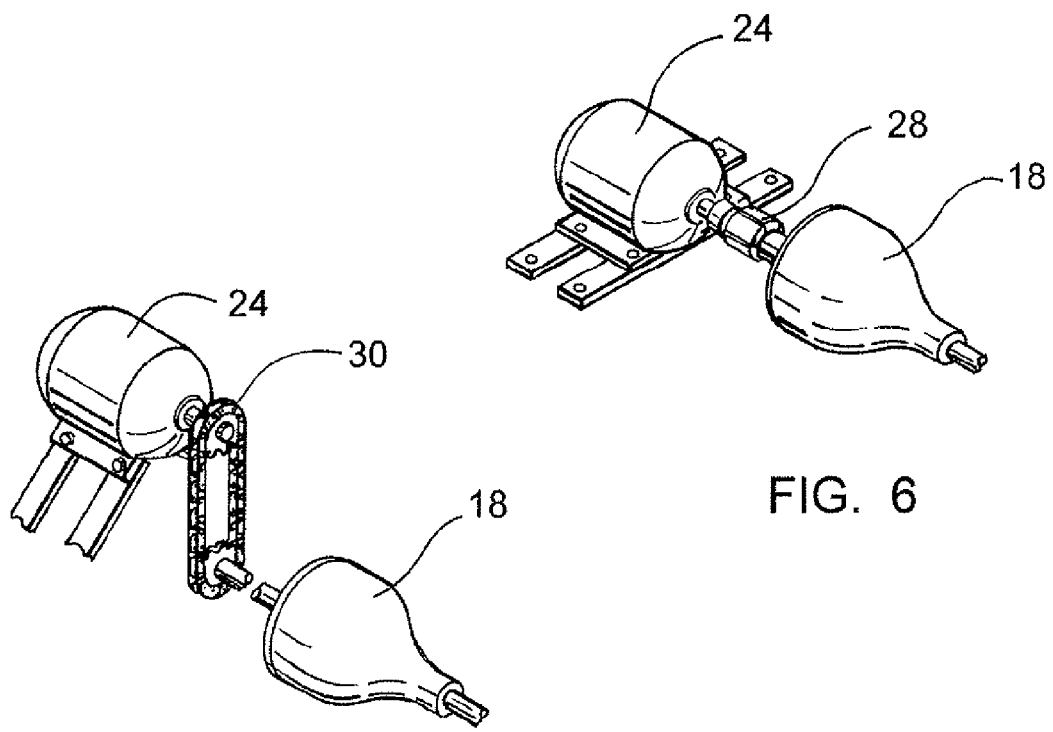
FIG. 6
FIG. 7

ELECTRICALLY POWERED VEHICLE ENGINE

CROSS-REFERENCE TO RELATED APPLICATIONS

Priority of U.S. Provisional Patent Application Ser. No. 60/735,465, filed Nov. 9, 2005, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to engines. More particularly, the present invention relates to an engine which is powered by electric power in order to obtain very efficient mileage on a small amount of gasoline to power the gasoline powered components of the vehicle.

2. General Background

In the field of power driven vehicles, it has become very evident that the use of gasoline to power vehicles is fast becoming inefficient, damaging to the environment and prohibitively expensive. There have been attempts to produce vehicles which are either powered totally electrically or a combination of gasoline and electricity, which have become to be called "hybrid" automobiles.

What is needed is a vehicle powered by a generator component in place of the gasoline powered engine, which is capable of producing 110 volts and 220 volts to power the vehicle and the other electrical components of the vehicle systems.

Applicant is providing an Information Disclosure Statement which lists a group of patents which were found in a search of the art. However, it is clear that none of the patents reveal the present invention, which is summarized below and covered in detail in the detail specification, drawings and the claim.

SUMMARY OF THE PRESENT INVENTION

The apparatus of the present invention solves the problems in the art in a simple and straightforward manner. What is provided is a vehicle which provides a standard vehicle body, transmission and electric system. There is further provided a generator component in place of the gasoline powered engine, which is capable of producing 110 volts and 220 volts to power the vehicle. There is further provided an electric motor engaged to the transmission via a chain or a universal joint. Further, there would be provided a 12 volt battery for powering the normal electrical components, namely the lights, radio, horn, fan, heater and other units. An electric motor would be utilized to operate the alternator, air compressor and vacuum pump to operate the power steering, power brakes and electric transmission. In addition, air generated by the compressor could be used to keep tires properly full, while the a.c. power could be used to power lamps, chain saws, stoves or electric tools, under camping or the like conditions.

Therefore, it is an object of the present invention to provide a vehicle powered by a generator, driven by gasoline;

It is a further object that the generator would provide power so that the vehicle is able to travel for two hours on a gallon of gas, traveling 110 to 140 miles, depending on the speed of the vehicle;

It is a further object that the vehicle would include a 6000 watt generator; an electric starter; automatic low oil shut down; Kohler engine, and have the ability to travel 14 to 18 hours on a seven gallon tank of gasoline;

It is a further object of the present invention to provide a vehicle wherein there would be provided a first 220 volt motor for powering the transmission and a 110 volt motor for powering other components of the vehicle.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 5 illustrates a side view of the system of the present invention;

FIG. 6 illustrates the universal joint linkup between the drive motor and the transmission; and FIG. 7 illustrates the chain driven linkup between the drive motor and the transmission of the present invention.

DETAILED DESCRIPTION OF THE PREFERRED EMBODIMENT

Figure 1:
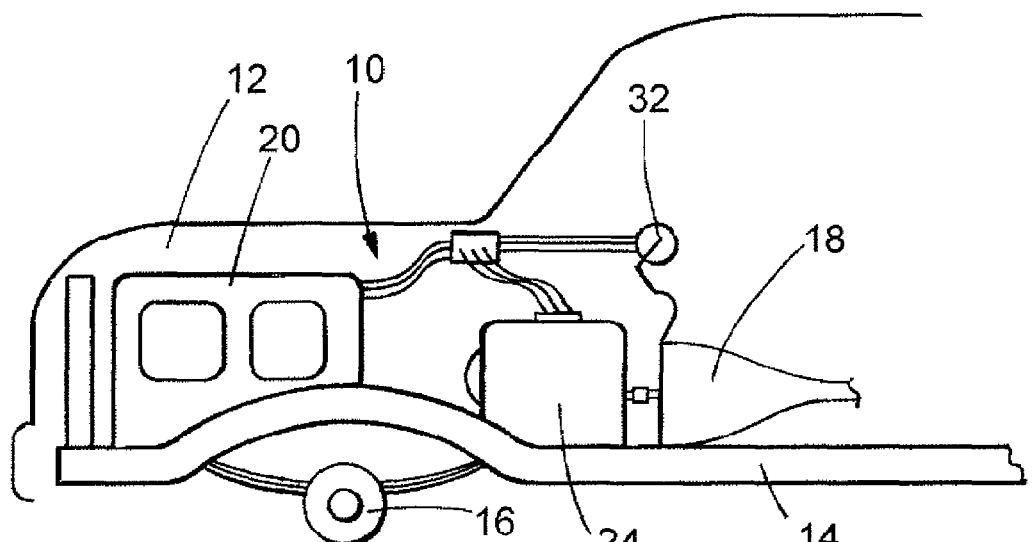
FIG. 1 illustrates a partial view of the generator, electric motor and transmission linkup utilized in the present invention.

FIGS. 1 through 7 illustrate the preferred embodiment of the High Efficiency Electrically Powered Vehicle Engine system of the present invention by the numeral 10. As illustrated in the figures, the system 10 is positioned within a typical vehicle chassis 12, having a frame 14 and wheels 16. The vehicle would also provide a standard transmission 18, used to drive the vehicle when powered up. Also, all of the typical electrically driven components, such as the radio, power windows, locks, lights, etc. would be present as in a typical vehicle.

The improved power system 10 would provide a generator 20, preferably capable of producing 6000 watts of power, the generator powered by gasoline from a gasoline tank 22. The generator 20 would provide power to various electric components of the system. As illustrated generator 20 would power first electric motor 24, which would be directly linked to the transmission 26, of the standard or automatic type used in vehicles. As seen in FIG. 6A, the motor 24 would be linked to transmission 26 with a universal joint 28, or as seen in FIG. 6B, there would be provided a chain 30 to link the motor 24 to transmission 26. There would be provided a variable resistor 32, as seen in FIG. 1, to complete the connection between the motor 24 and the transmission 26.

Figure 2A:
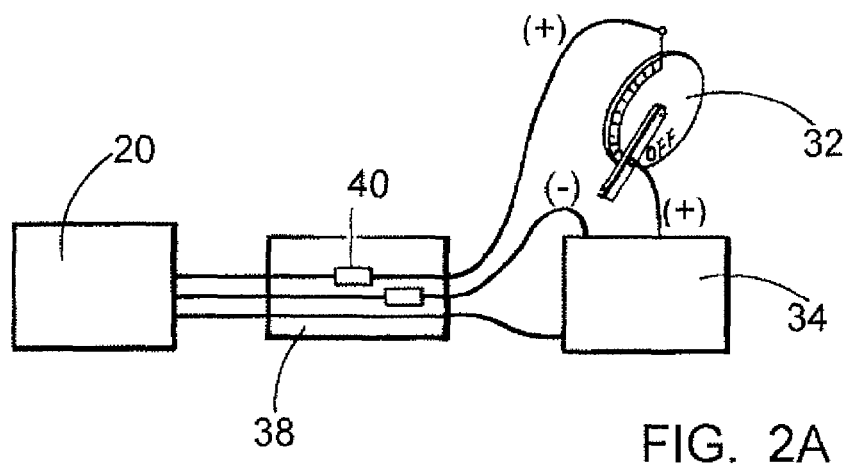
FIGS. 2A and 2B illustrate views of the generator providing 110V and 220V power to certain components of the vehicle of the present invention.
Figure 2B:
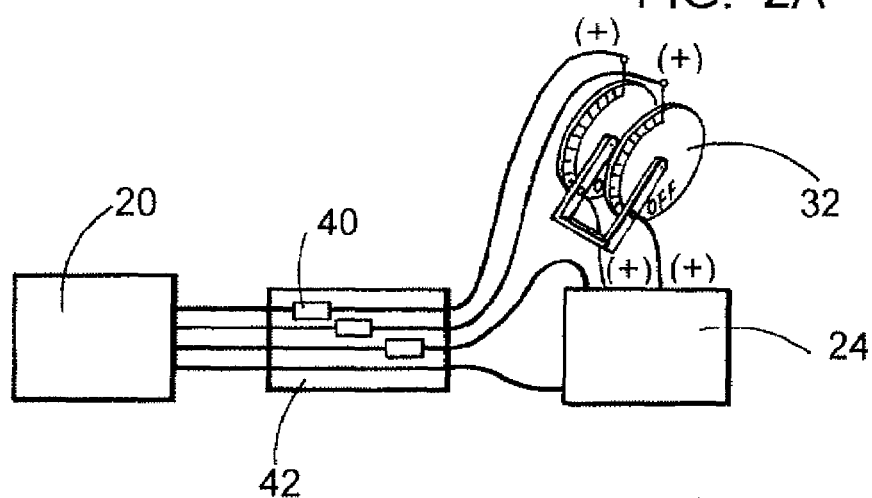

In FIGS. 2A and 2B there is illustrated the generator 20 powering the 110 volt motor 34, having been properly fused via 110 volt fuses 36 in fuse box 38. While 2B illustrates generator 20 powering the 220 volt motor 24, again through 220 volt fuses 40 in fuse box 42. In both instances there would be provided a variable resistor 32 in the link between the generator 20 and the motors 24 and 34.

Figure 3:
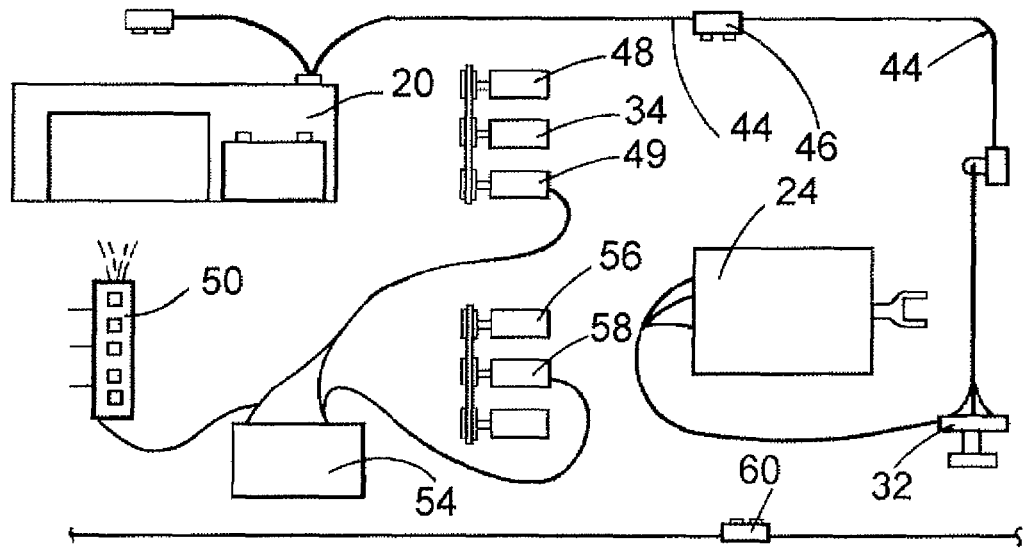
FIG. 3 illustrates an overall view of the various components powered by the generator and electric motors of the present invention.

FIG. 3 illustrates the entire system 10 of the efficient engine of the present invention. The generator 20 is connected via line 44 to a 110 volt outlet 46 for powering 110 volt motor 34. The motor 34 powers an AC compressor 48 and an alternator 49 when through a 12 volt fuse system 50 provides power to the headlights, emergency light, windshield wipers, radio, horn, etc., as seen by numeral 52. There is also provided power from a battery 54, when generator is not running, to power the air compressor 56, the 12 volt motor 58, which powers the power steering, and the system for powering the air compressor tires. Line 44 would further connect to 220 volt motor 24, which would connect directly to the transmission 26, as described earlier through a universal joint of a chain connection. There is also illustrated a spare outlet 60 which would power tools or the like when the vehicle is used in recreational setting or the like.

Figure 4:
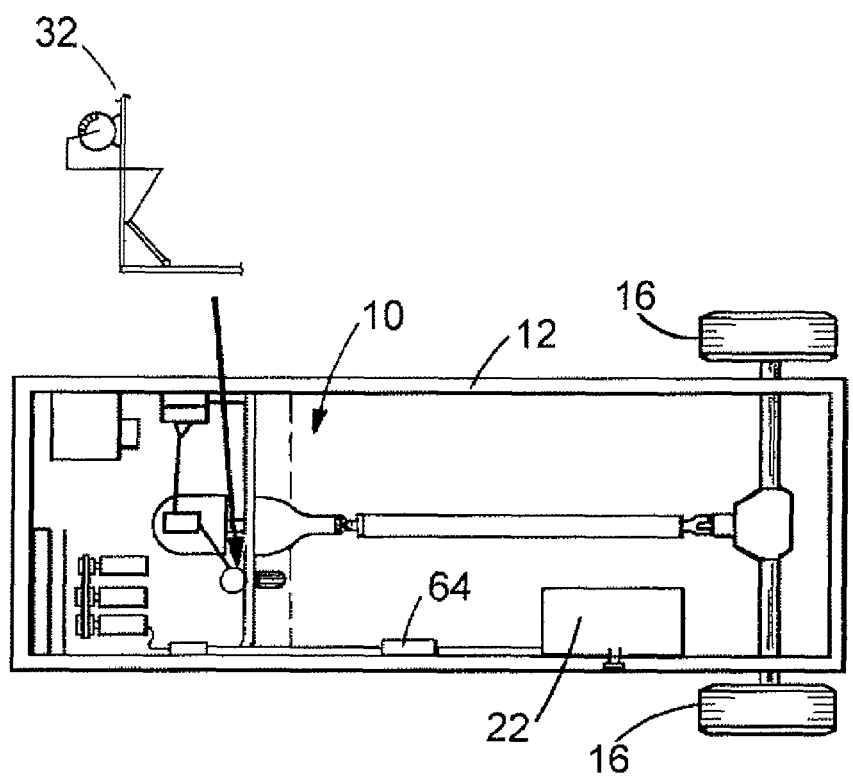
FIG. 4 illustrates a top view of the system of the present invention.

In FIGS. 4 and 5 there are provided top and side views respectively of the system as described above. Other than the components described FIG. 4 illustrates the gas tank 22 and fuel pump 64 which would provide the necessary fuel to the generator 20 to enable it to provide the power to the entire system. As discussed, it is foreseen tank 22 could only need to hold under 10 gallons of gas which would be more than enough to allow the vehicle to travel for example between New Orleans and Biloxi, Miss. on one gallon of gas, averaging between 110 and 140 miles to the gallon, depending on the speed of the vehicle.

All measurements disclosed herein are at standard temperature and pressure, at sea level on Earth, unless indicated otherwise.

PARTS LIST

| Part Number | Description |
| --- | --- |
| 10 | vehicle engine system |
| 12 | chassis |
| 14 | frame |
| 16 | wheels |
| 18 | transmission |
| 20 | generator |
| 22 | gasoline tank |
| 24 | first electric mower |
| 26 | transmission |
| 28 | universal joint |
| 30 | chain |
| 32 | variable resistor |
| 34 | 110 volt motor |
| 36 | fuses |
| 38 | fuse box |
| 40 | fuses |
| 42 | fuse box |
| 44 | line |
| 46 | outlet |
| 48 | compressor |
| 49 | alternator |
| 50 | 12 volt fuel system |
| 52 | numeral |
| 54 | battery |
| 56 | air compressor |

-continued

PARTS LIST

| Part Number | Description |
| --- | --- |
| 58 | 12 volt motor |
| 60 | spare outlet |
| 64 | fuel pump |

The foregoing embodiments are presented by way of example only; the scope of the present invention is to be limited only by the following claims.

What is claimed is:

1. An energy efficient vehicle propulsion design, comprising:
   a hydrocarbon fuel generator (20) that consumes a constant amount of fuel on a per hour basis, capable of producing AC electrical power to run a first AC electric power motor (24) and a second AC electric power motor (34);
   the first AC electric power motor is a 220 volt motor and is linked to a transmission of the vehicle to turn the transmission in order to propel the vehicle under various conditions;
   the second AC electric power motor is a 110 volt motor and powers an AC compressor and an alternator;
   a rheostat/variable resistor is connected between the generator and the first AC electric motor to increase or decrease AC power to the first AC electric motor so that the motor increases or decreases in speed to provide more or less torque to a transmission (18) of the vehicle;
   one or more batteries to store excess power generated by the generator that is not used by the first or second AC electric power motors;
   wherein excess power stored in the one or more batteries is supplied to the first AC electric power motor to supplement power provided by the generator when the vehicle is accelerating or in a state which requires additional power, excess power is supplied to the first and second AC electric motors when the generator is off, and excess power is used to electrically start the generator; and
   wherein, the hydrocarbon fuel generator continues to provide constant power during all driving conditions to the effect that the vehicle's fuel consumption is based on the equation gallons of fuel burned=miles per hour times number of hours (gallons=mph×hours).

2. The energy efficient vehicle propulsion design of claim 1, wherein the second AC electric motor provides 110 v volts to power the headlights, emergency light, windshield wipers, radio, horn, TV, heater and other components of the vehicle.

3. The energy efficient vehicle propulsion design of claim 1, wherein the AC compressor provides air to keep vehicle tires inflated.

4. The energy efficient vehicle propulsion design of claim 1, further comprising a spare electric outlet to allow a user to connect and power various tools.

5. The energy efficient vehicle propulsion design of claim 4, wherein the spare electric outlet also allows the user to power camping equipment or emergency equipment during a storm.

6. The energy efficient vehicle propulsion design of claim 1, further comprising a low-oil shutdown.

* * * * *